(12) United States Patent
Shobu

(10) Patent No.: US 8,259,328 B2
(45) Date of Patent: Sep. 4, 2012

(54) APPARATUS FOR TRANSMITTING IMAGE

(75) Inventor: Toshifumi Shobu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1285 days.

(21) Appl. No.: 11/958,051

(22) Filed: Dec. 17, 2007

(65) Prior Publication Data

US 2008/0151318 A1  Jun. 26, 2008

(30) Foreign Application Priority Data

Dec. 20, 2006  (JP) ................................. 2006-342188

(51) Int. Cl.
*G06F 15/00* (2006.01)
*G06F 3/12* (2006.01)
*G06K 1/00* (2006.01)
*G06K 15/00* (2006.01)

(52) U.S. Cl. ..................................... 358/1.15; 358/1.14

(58) Field of Classification Search ................. 358/1.15, 358/1.13, 1.14
See application file for complete search history.

(56) References Cited

U.S. PATENT DOCUMENTS 6,961,144 B2 * 11/2005 Usami ........................... 358/1.15

FOREIGN PATENT DOCUMENTS

| JP | 8-139891 | 5/1996 |
|---|---|---|
| JP | 11-215286 | 8/1999 |
| JP | 2004-118653 | 4/2004 |
| JP | 2004-152260 | 5/2004 |
| JP | 2004-192610 | 7/2004 |
| JP | 2004-229041 | 8/2004 |
| JP | 2005-38371 | 2/2005 |
| JP | 2005-38372 | 2/2005 |
| JP | 2005-136818 | 5/2005 |
| JP | 2005-151149 | 6/2005 |
| JP | 2005-186498 | 7/2005 |
| JP | 2005-190365 | 7/2005 |
| JP | 2005-246705 | 9/2005 |
| JP | 2005-301510 | 10/2005 |
| JP | 2005-316515 | 11/2005 |
| JP | 2006-50161 | 2/2006 |
| JP | 2006-135777 | 5/2006 |
| JP | 2006-173909 | 6/2006 |

OTHER PUBLICATIONS

Jan. 24, 2012 Japanese official action in connection with a counterpart Japanese patent application.
Apr. 24, 2012 Japanese official action in connection with a counterpart Japanese patent application.

* cited by examiner

*Primary Examiner* — Douglas Tran
(74) *Attorney, Agent, or Firm* — Cooper & Dunham LLP

(57) ABSTRACT

An image transmitting apparatus transmits an image of a document in which an information disclosure level is set. A transmission operation to a specified destination is performed when an information disclosure level set in the specified destination is higher than the information disclosure level set in a document to be transmitted.

5 Claims, 12 Drawing Sheets

FIG. 2A

| DESTINATION INFORMATION #1 |
|---|
| DESTINATION INFORMATION #2 |
| ... |
| DESTINATION INFORMATION #n |

ADDRESS BOOK

FIG. 2B

| DESTINATION ID |
|---|
| DESTINATION NAME |
| FAX NUMBER (ADDRESS FOR FAX COMMUNICATION) |
| MAIL ADDRESS (ADDRESS FOR T.37 COMMUNICATION) |
| IP ADDRESS (ADDRESS FOR T.38 COMMUNICATION) |

DESTINATION INFORMATION

DOCUMENT WITH BACKGROUND PATTERN
IN FULL AREA OF PAGE

BACKGROUND
PATTERN

DOCUMENT WITH BACKGROUND PATTERN
IN PARTIAL AREA OF PAGE

DOCUMENT IN WHICH BARCODE IS EMBEDDED BY EACH PAGE

DOCUMENT IN WHICH BARCODE IS EMBEDDED BY EACH IMAGE AREA

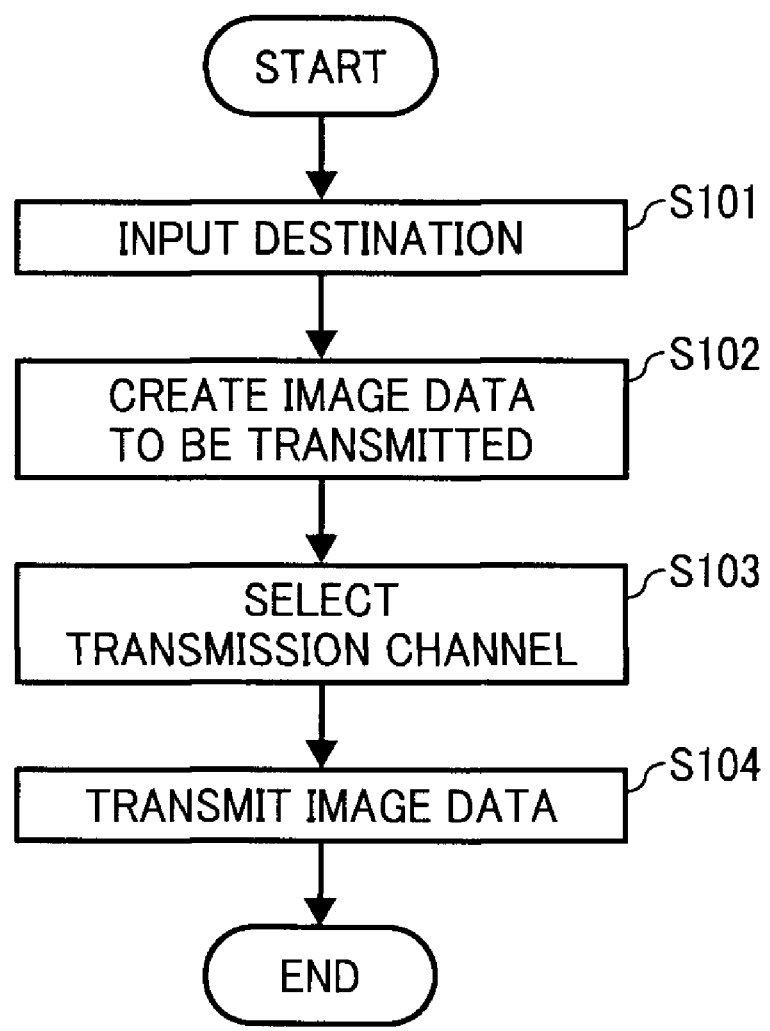

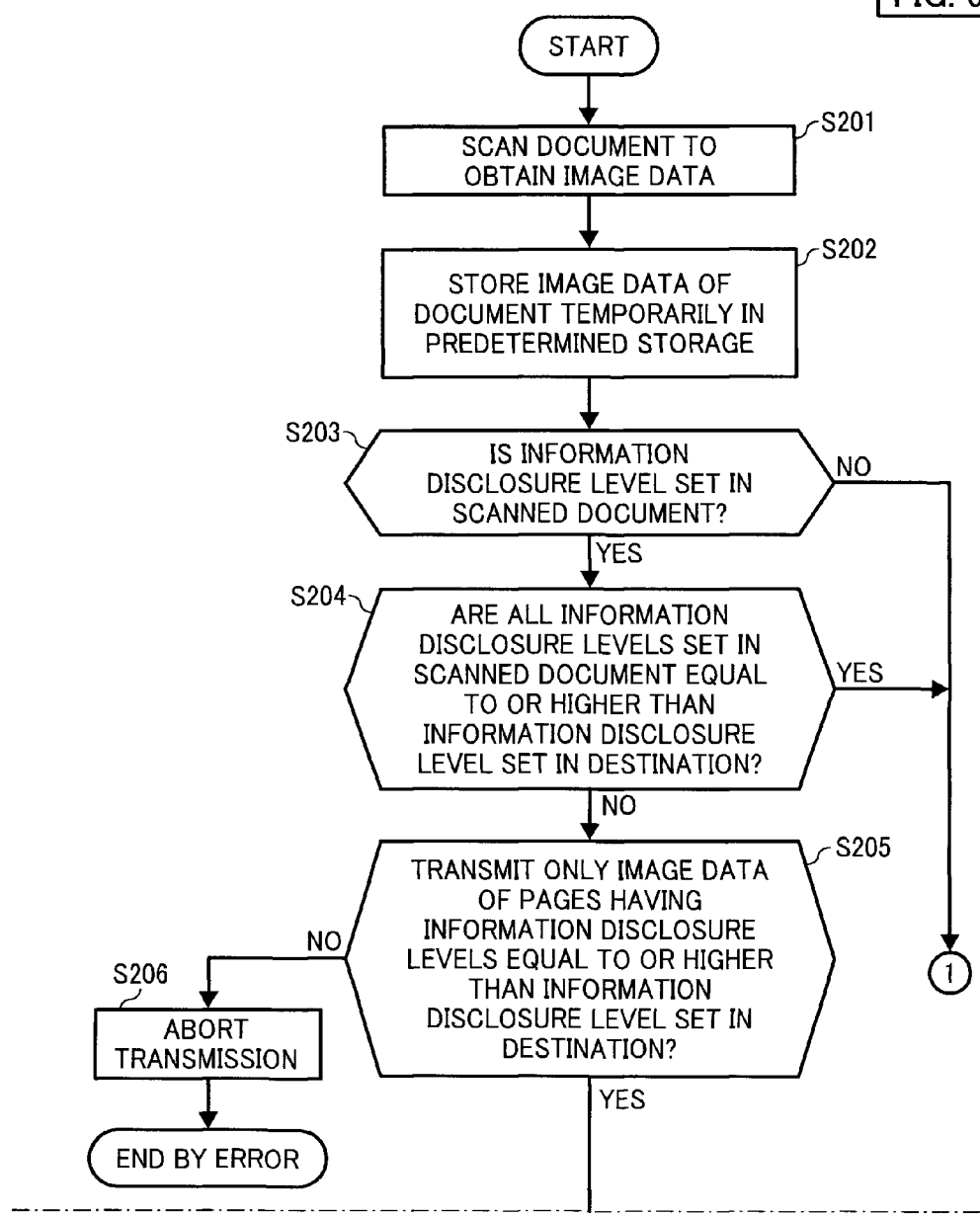

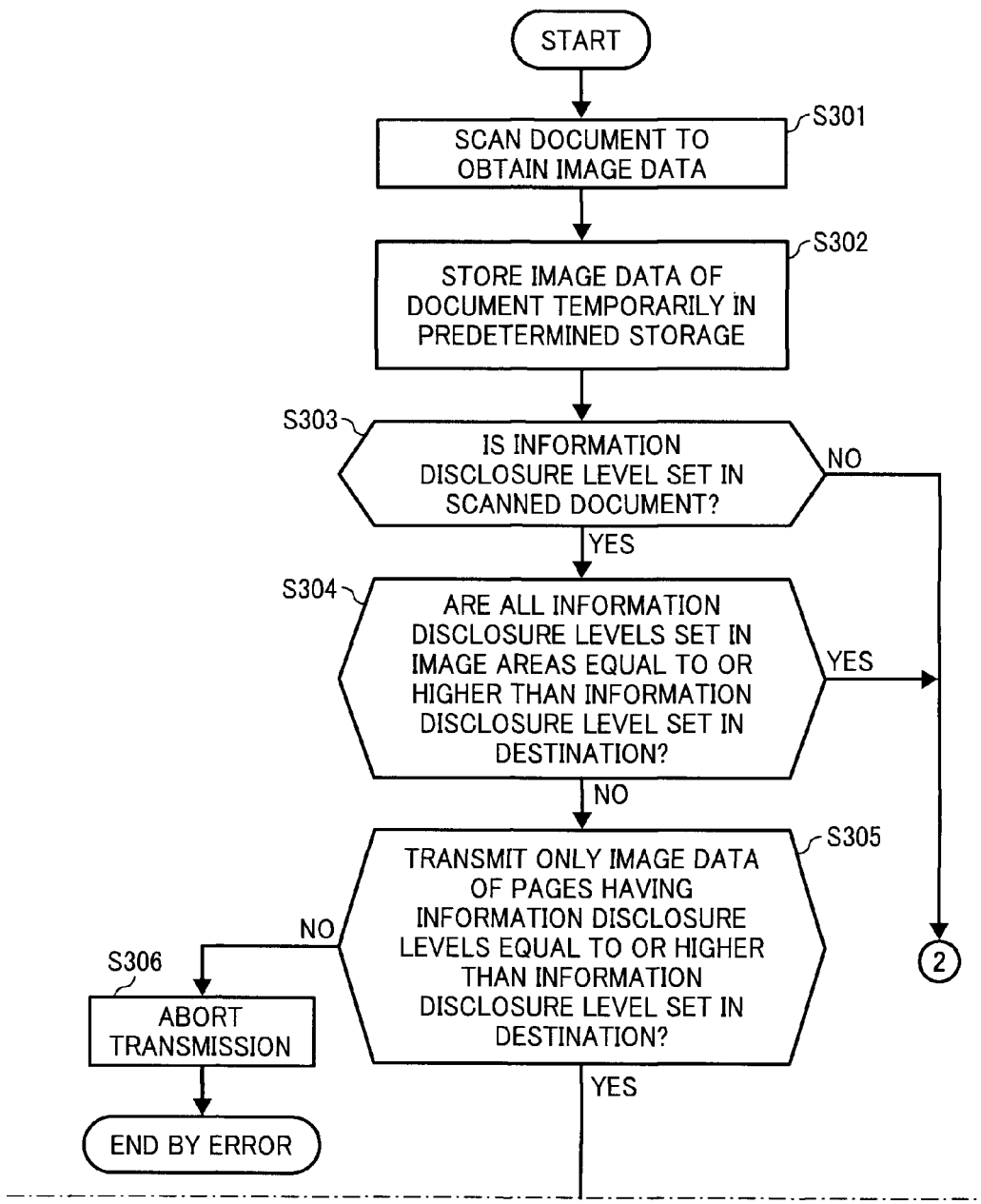

APPARATUS FOR TRANSMITTING IMAGE

CROSS-REFERENCE TO RELATED APPLICATIONS

The present application claims priority to and incorporates by reference the entire contents of Japanese priority document 2006-342188 filed in Japan on Dec. 20, 2006.

BACKGROUND

1. Technical Field

This disclosure relates to a technology for transmitting image data of a document with an information disclosure level.

2. Description of the Related Art

Recent management of image data of a document employs additional information such as an information disclosure level embedded in the image data in a pattern of a background or in a form of a barcode. The embedded additional information read at the time of scanning the image data can be used to protect the image data from being illegally used.

By setting the information disclosure level, such as "for internal consumption only", "confidential", or "an ordinary document", in information in advance, a disclosure of the information can be controlled.

Moreover, today's demand for enhancing information security requires more detailed security settings, necessitating, for example, a change of an information disclosure level depending on a destination for transmitting image information (see, for example, Japanese Patent Application Laid-open No. 2005-151149).

However, in a case where an information disclosure level is set in a document in a pattern of a background or a form of a barcode, a sender cannot recognize the information disclosure level, which may lead to a wrong transmission. Particularly, when the sender is not a creator of the document, such a problem occurs highly likely.

BRIEF SUMMARY

In an aspect of this disclosure, there is provided an apparatus for transmitting an image of a document in which an information disclosure level is set wherein a transmission operation to a specified destination is performed when an information disclosure level set in the specified destination is higher than the information disclosure level set in a document to be transmitted.

In another aspect of this disclosure, there is provided an apparatus for transmitting an image of a document in which an information disclosure level is set wherein the apparatus selects a document having an information disclosure level lower than an information disclosure level set in a specified destination, and transmits an image of a selected document to the specified destination.

In still another aspect of this disclosure, there is provided an apparatus for transmitting an image of a document in which an information disclosure level is set by each image area wherein a transmission operation to a specified destination is performed when an information disclosure level set in the specified destination is higher than the information disclosure level set in all image areas.

In yet another aspect of this disclosure, there is provided an apparatus for transmitting an image of a document in which an information disclosure level is set by each image area wherein the apparatus selects an image area having an information disclosure level lower than an information disclosure level set in a specified destination, and transmits an image of a selected image area to the specified destination.

The aforementioned and other aspects, features, advantages and technical and industrial significance will be better understood by reading the following detailed description of presently preferred embodiments of the invention, when considered in connection with the accompanying drawings.

BRIEF DESCRIPTION OF THE DRAWINGS

FIG. 2A is an example of an address book in which destination information is registered;

FIG. 2B is an example of the destination information;

FIG. 5 is a flowchart of a process of transmitting image data;

DETAILED DESCRIPTION OF THE PREFERRED EMBODIMENTS

Exemplary embodiments of the present invention are explained in detail below with reference to the accompanying drawings.

Figure 1:
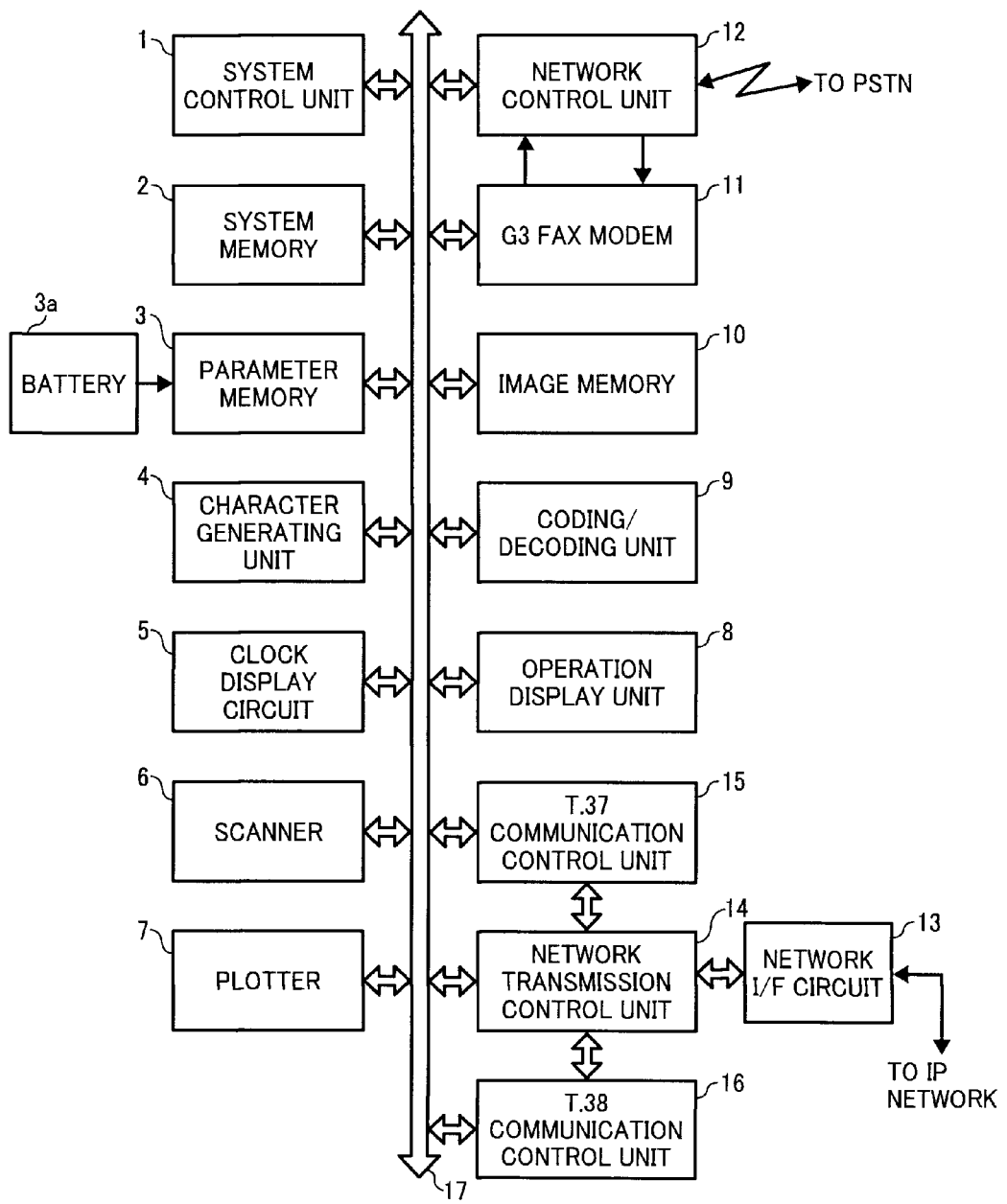
FIG. 1 is a schematic diagram of a network facsimile (fax) apparatus according to an embodiment of the present invention.

FIG. 1 is a schematic diagram of a network facsimile (fax) apparatus according to an embodiment of the present invention. The network fax apparatus is connected to an analog public network such as a public switched telephone network (PSTN) (not shown) and an Internet protocol (IP) network (not shown). In a case of using the PSTN, the network fax apparatus performs a group 3 (G3) fax communication. In a case of using the IP network, the network fax apparatus performs a network fax communication with an e-mail based on the International Telecommunication Union Telecommunication Standardization Sector (ITU-T) standard T.37 or a real-time network fax communication based on the ITU-T standard T.38. The network fax apparatus includes a system control unit 1, a system memory 2, a parameter memory 3, a battery 3a, a character generating unit 4, a clock display circuit 5, a scanner 6, a plotter 7, an operation display unit 8, a coding/decoding unit 9, an image memory 10, a G3 fax modem 11, a network control unit 12, a network interface (I/F) circuit 13, a network transmission control unit 14, a T.37 communication control unit 15, and a T.38 communication control unit 16.

The system control unit 1 controls each unit included in the network fax apparatus, and performs each process such as a fax transmission control process. The system memory 2 stores therein a control process program executed by the system control unit 1, data required for the execution of the control process program, and the like. The system memory 2 is used as a working area of the system control unit 1. The parameter memory 3 stores therein various pieces of information unique to the network fax apparatus. The parameter memory 3 is backed up by the battery 3a.

The character generating unit 4 generates display data in graphic characters. The clock display circuit 5 outputs a current time.

The scanner 6 scans a document at a predetermined resolution. The plotter 7 outputs a document image at a predetermined resolution. The operation display unit 8 includes operation keys and indicators for operating the network fax apparatus.

The coding/decoding unit 9 compressively encodes an image signal, and decodes compressively-encoded image data into an original image signal. The image memory 10 stores therein a number of compressively-encoded image data.

The fax modem 11 enables a G3 fax modem function, and includes a low-speed modem function for exchanging a transmission processing signal (such as a V.21 modem) and a high-speed modem function for exchanging image data mainly (such as a V.17 modem, a V.34 modem, a V.29 modem, a V.27 ter modem).

The network control unit 12 connects the network fax apparatus to the PSTN, and includes an automatic transmitting and receiving function.

The network I/F circuit 13 connects the network fax apparatus to the IP network such as a local area network and the Internet. The network transmission control unit 14 performs a communication control process of a predetermined protocol suite for exchanging data among other data terminal devices via the IP network. The T.37 communication control unit 15 enables a communication function for the network fax communication with an e-mail based on the ITU-T standard T.37. The T.38 communication control unit 16 enables a communication function for the real-time network fax communication based on the ITU-T standard T.38.

The system control unit 1, the system memory 2, the parameter memory 3, the character generating unit 4, the clock display circuit 5, the scanner 6, the plotter 7, the operation display unit 8, the coding/decoding unit 9, the image memory 10, the fax modem 11, the network control unit 12, the network transmission control unit 14, the T.37 communication control unit 15, and the T.38 communication control unit 16 are connected to an internal bus 17, and exchange data among these elements via the internal bus 17 mainly. Data is directly exchanged between the network control unit 12 and the fax modem 11.

According to the embodiment, the data exchange between the terminals on the IP network is basically made by a combination of transmission protocols up to a transport layer, so-called "a TCP/IP", and communication protocols in upper layers (so-called "a protocol suite"). For example, when an e-mail is used for the data exchange, a simple mail transfer protocol (SMTP) is used as the communication protocol in the upper layer.

The network fax apparatus further includes a function of an address book to store therein a plurality of destination information as shown in FIG. 2A.

As shown in FIG. 2B, each of the destination information includes a destination identification (ID), a destination name, a fax number, a mail address, and an IP address. The destination ID is a unique ID assigned to each destination. The destination name is a name of a destination corresponding to the destination ID. The fax number is used as an address of the destination when image data is transmitted by the G3 fax communication. The mail address is used as an address of the destination when image data is transmitted by the T.37 communication (i.e., the network fax communication with an e-mail). The IP address is used as an address of the destination when image data is transmitted by the T.38 communication (i.e., the real-time network fax communication).

The address for the T.38 communication is not limited to the IP address. For example, an alias registered in a gate keeper of the ITU-T standard H.323 or a session initiation protocol (SIP) server can be used as the address for the T.38 communication. Furthermore, in a case of using the VoIP for the T.38 communication, an IP telephone number can be used as the address for the T.38 communication. The destination information may indicate each piece of address information.

Depending on a destination, any of the fax number, the mail address, and the IP address may not be included in the destination information. For example, in a case of a G3 fax apparatus as a destination, only a fax number is stored in the destination information. In a case where a destination apparatus includes two functions of the G3 fax communication and the T.37 communication, a fax number and a mail address are stored in the destination information.

According to the embodiment, the communication function is associated with a transmission channel. For example, when image data is transmitted by the G3 fax communication, a transmission channel to be used is referred to as "the PSTN (a closed network)". When image data is transmitted by the T.37 communication, a transmission channel to be used is referred to as "the T.37 communication". When image data is transmitted by the T.38 communication, a transmission channel to be used is referred to as "the T.38 communication".

In view of the risk of information leakage, the G3 fax communication using the PSTN has the lowest risk, while the T.37 communication using an e-mail has the highest risk. As for the T.38 communication, for example, by the application of an IP security protocol (IPsec), the T.38 communication can obtain a communication security level similar to a communication security level obtained in the PSTN.

The information disclosure levels of the transmission channels are defined as

"the G3 fax communication"="the T.38 (IPsec) communication (i.e., the T.38 communication with the application of the IPsec)">"the T.38 communication">"the T.37 communication"

Namely, "the G3 fax communication" and "the T.38 (IPsec) communication" have the highest information disclosure level (i.e., the highest communication security level), and "the T.37 communication" has the lowest information disclosure level.

Figure 3A:
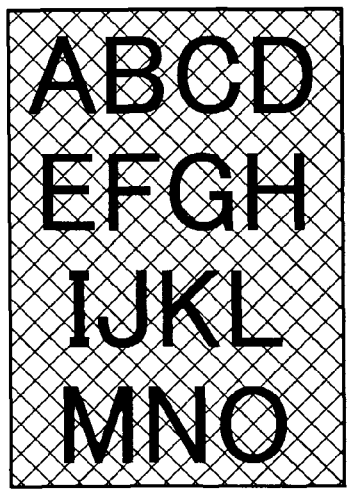
FIG. 3A is an example of a document in which a background pattern is embedded in a full area of a page.

As for a document to be transmitted, in a case shown in FIG. 3A, the document is overlapped with a background pattern in a full area of a page, and an information disclosure level (a security level) is embedded in the background pattern as additional information.

For example, "confidential", "with limitation", or "without limitation" can be set as the information disclosure level. In this case, the information disclosure level gets higher in the order of "without limitation", "with limitation", and "confidential". In other words, "confidential" has the highest information disclosure level (i.e., the highest communication security level), and "without limitation" has the lowest information disclosure level.

When image data of the document is transmitted, an information disclosure level set by each page of the document is obtained by analyzing a content of the background pattern.

Figure 3B:
FIG. 3B is an example of the background pattern.
Figure 3C:
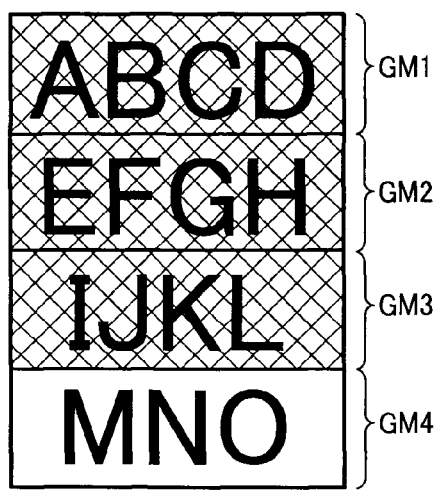
FIG. 3C is another example of the document in which the background pattern is embedded in a partial area of a page.

Alternatively, as shown in FIG. 3C, each page of the document is split into a plurality of image areas GM1 to GM4, and any of the image areas GM1 to GM4 (in this case, the GM1, the GM2, and the GM3) can be partially overlapped with the background pattern. Moreover, each of the image areas GM1 to GM4 can be set by a different information disclosure level separately.

Figure 4A:
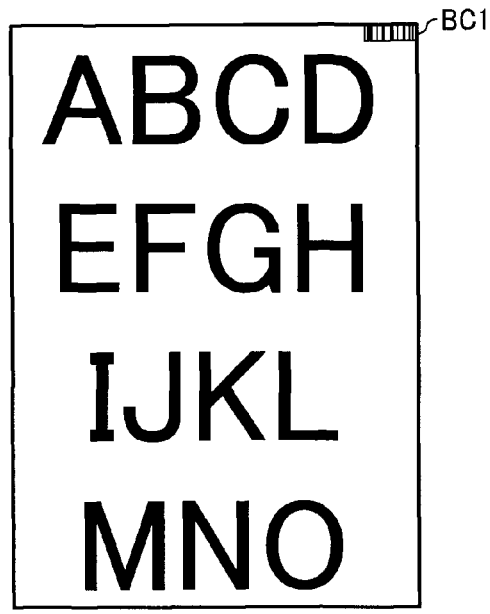
FIG. 4A is an example of a document in which a barcode is embedded by each page of the document.
Figure 4B:
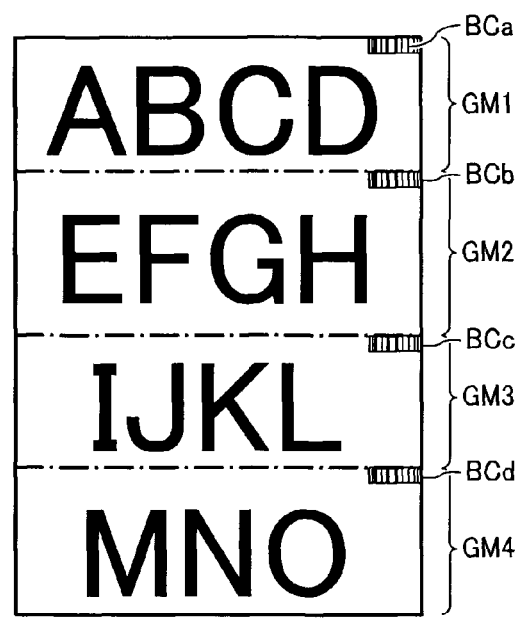
FIG. 4B is another example of the document in which the barcode is embedded by each area composing a page of the document.

As shown in FIGS. 4A and 4B, a barcode can be used as the additional information instead of the background pattern shown in FIGS. 3A to 3C. In a case shown in FIG. 4A, a barcode BC1 is embedded in each page of a document, i.e., an information disclosure level is set by each page. In a case shown in FIG. 4B, each page of the document is split into the image areas GM1 to GM4, and barcodes BCa, BCb, BCc, and BCd are respectively embedded in the image areas GM1 to GM4, i.e., an information disclosure level is set by each image area.

A transmission of image data of the document to a destination is decided by comparing the information disclosure level set in the document with the information disclosure level set in the destination.

FIG. 5 is a flowchart of a process of transmitting image data of a document briefly.

After setting a document to be transmitted on the scanner 6, a user inputs a destination by operating the operation display unit 8 (step S101). At this time, the user can select the destination from a destination list in the address book, and also select a transmission channel arbitrarily.

When the document is scanned by the scanner 6, a background pattern of the document as additional information is analyzed to determine an information disclosure level set in the document. An information disclosure level of the destination selected by the user is also determined. A content of an image (image data) to be transmitted is determined based on the information disclosure levels, and image data to be transmitted is created (step S102).

Subsequently, a transmission channel is selected (step S103). Basically, the transmission channel is selected based on the information disclosure level set in the document with making allowance for the transmission channel selected by the user.

The image data created at step S102 is transmitted via the transmission channel selected at step S103 (step S104).

Figure 6B:
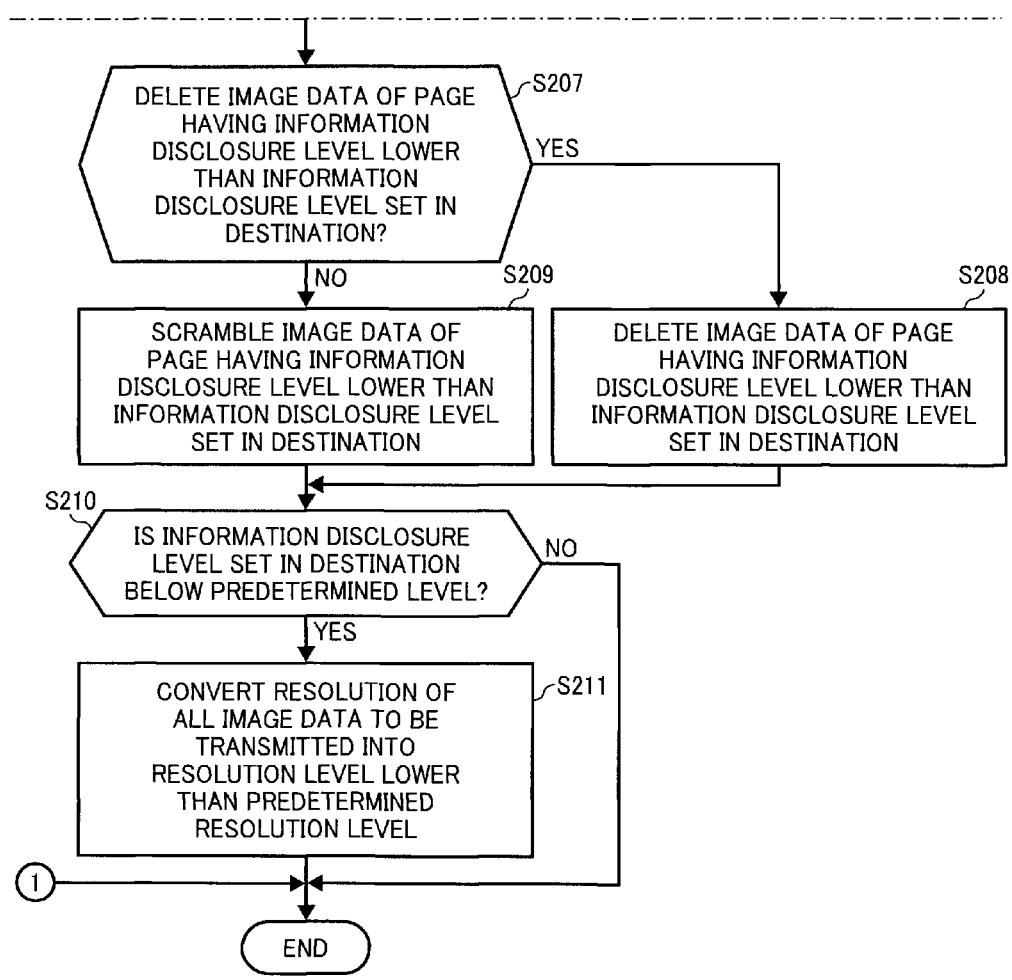
FIG. 6 is a flowchart of an example of a process of creating image data to be transmitted.

FIG. 6 is a flowchart of an example of the process of creating image data to be transmitted at step S102. In the example shown in FIG. 6, it is assumed that an information disclosure level is set by each page of a document.

All pages of the document to be transmitted are scanned to obtain image data by the scanner 6 (step S201). The image data of the document is temporarily stored in a predetermined storage (step S202). At this time, a background pattern of each page of the document is analyzed to determine an information disclosure level set in each page of the document as additional information.

It is determined whether an information disclosure level is set in the scanned document (step S203). If no information disclosure level is set in the scanned document (NO at step S203), the process is terminated. In this case, all the image data of the scanned document is transmitted without limitation.

If an information disclosure level is set in the scanned document (YES at step S203), it is determined whether all information disclosure levels set in the scanned document are equal to or higher than an information disclosure level set in the specified destination (step S204). If all the information disclosure levels set in the scanned document are equal to or higher than the information disclosure level set in the destination (YES at step S204), the process is terminated and steps S205-S211 are not performed, as shown in FIG. 6. In this case, all the image data of the scanned document is transmitted without limitation (by S205-S211).

If an information disclosure level of at least one page of the scanned document is lower than the information disclosure level set in the destination (NO at step S204), it is determined whether the system control is set to transmit only image data of the remaining pages, i.e., only image data of the pages having the information disclosure level equal to or higher than the information disclosure level set in the destination (step S205).

If the determination at step S205 is negative (NO at step S205), no image data is transmitted to the destination because the condition is not met (step S206). The process is terminated by an error. The operation display unit 8 can display thereon a message indicating the error.

On the other hand, if the system control is set to transmit only image data of the pages having the information disclosure level equal to or higher than the information disclosure level set in the destination (YES at step S205), it is further determined whether the system control is set to delete image data of the page having the information disclosure level lower than the information disclosure level set in the destination (step S207).

If the system control is set to delete the image data of the page having the information disclosure level lower than the information disclosure level set in the destination (YES at step S207), the image data of the page having the information disclosure level lower than the information disclosure level set in the destination is deleted (step S208). If the determination at step S207 is negative (NO at step S207), the image data of the page having the information disclosure level lower than the information disclosure level set in the destination is scrambled (step S209). Specifically, the image data is scrambled in such a manner that the image data is replaced with, for example, a mosaic-patterned image, an image all in white, or an image all in black. Anyhow, the image data of the page having the information disclosure level lower than the information disclosure level set in the destination is not transmitted properly.

Subsequently, it is determined whether the information disclosure level set in the destination is below a predetermined level (step S210). For example, "the T.38 communication" having the second highest information disclosure level can be set as "the predetermined level".

If the information disclosure level set in the destination is below the predetermined level (YES at step S210), a resolution of all the image data to be transmitted is converted into a resolution lower than a predetermined resolution level (step S211). As a result, it is possible to restrict the image data to be reused by the receiving side (the destination). If the information disclosure level of the destination exceeds the predetermined level (NO at step S210), the image data is transmitted without any change.

Figure 7B:
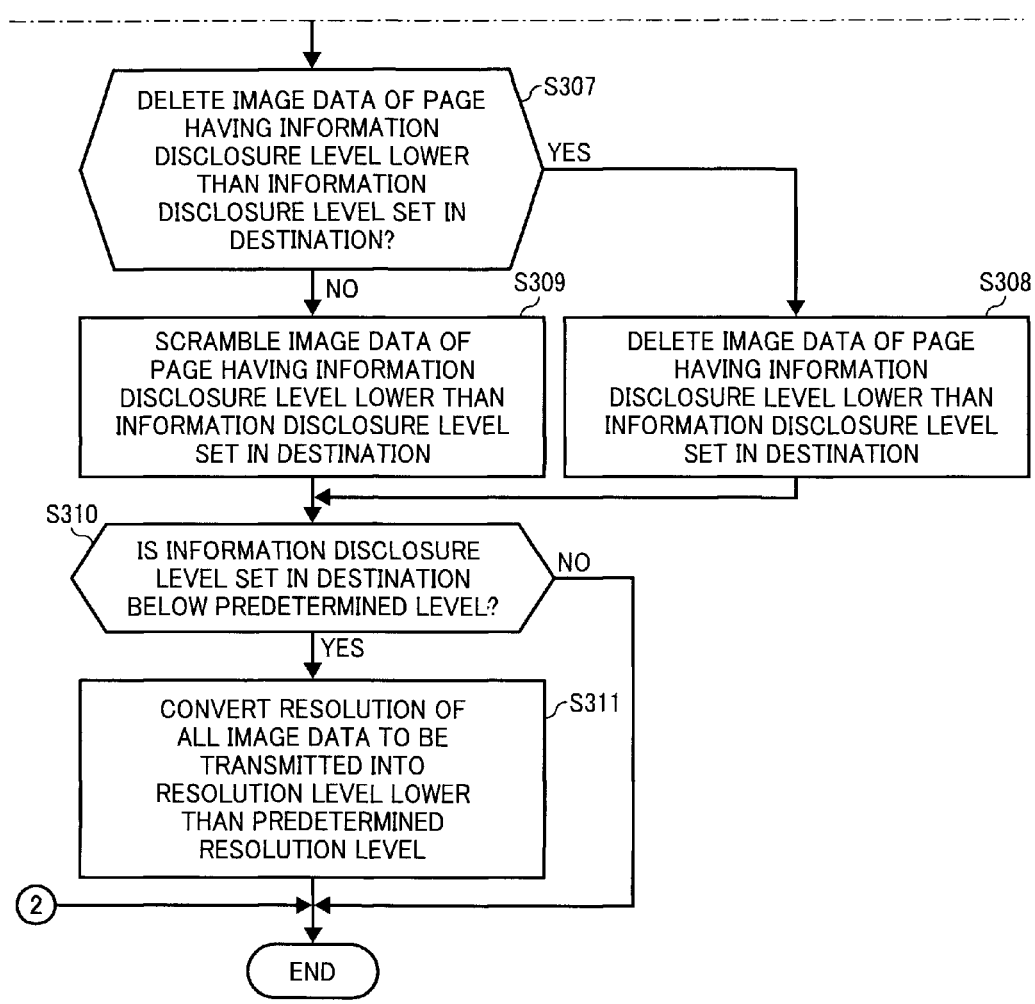
FIG. 7 is a flowchart of another example of the process of creating image data to be transmitted.

FIG. 7 is a flowchart of another example of the process of creating image data to be transmitted at step S102. In the example shown in FIG. 7, it is assumed that each page of the document is split into a plurality of image areas, and an information disclosure level is set by each of the image areas.

All pages of the document to be transmitted are scanned to obtain image data by the scanner 6 (step S301). The image data of the document is temporarily stored in a predetermined storage (step S302). At this time, a background pattern of each of the image areas is analyzed to determine an information disclosure level set in each of the image areas as additional information.

It is determined whether an information disclosure level is set in the scanned document (step S303). If no information disclosure level is set in the scanned document (NO at step S303), the process is terminated. In this case, all the image data of the scanned document is transmitted without limitation.

If an information disclosure level is set in the scanned document (YES at step S303), it is determined whether all information disclosure levels set in the image areas are equal to or higher than an information disclosure level set in the specified destination (step S304). If all the information disclosure levels set in the image areas are higher than the information disclosure level set in the destination (YES at step S304), the process is terminated. In this case, all the image data of the scanned document is transmitted without limitation.

If an information disclosure level of at least one of the image areas is lower than the information disclosure level set in the destination (NO at step S304), it is determined whether the system control is set to transmit only image data of the remaining image areas, i.e., only image data of the image areas having the information disclosure level equal to or higher than the information disclosure level set in the destination (step S305).

If the determination at step S305 is negative (NO at step S305), no image data of the scanned document is transmitted to the destination because the condition is not met (step S306). The process is terminated by an error. The operation display unit 8 can display thereon a message indicating the error.

On the other hand, if the system control is set to transmit only image data of the image areas having the information disclosure level equal to or higher than the information disclosure level set in the destination (YES at step S305), it is further determined whether the system control is set to delete image data of the image area having the information disclosure level lower than the information disclosure level set in the destination (step S307).

If the system control is set to delete image data of the image area having the information disclosure level lower than the information disclosure level set in the destination (YES at step S307), the image data of the image area having the information disclosure level lower than the information disclosure level set in the destination is deleted (step S308). If the determination at step S307 is negative (NO at step S307), the image data of the image area having the information disclosure level lower than the information disclosure level set in the destination is scrambled (step S309). Specifically, the image data is scrambled in such a manner that the image data is replaced with, for example, a mosaic-patterned image, an image all in white, or an image all in black. Anyhow, the image data of the image area having the information disclosure level lower than the information disclosure level set in the destination is not transmitted properly.

Subsequently, it is determined whether the information disclosure level set in the destination is below a predetermined level (step S310). For example, "the T.38 communication" having the second highest information disclosure level can be set as "the predetermined level".

If the information disclosure level set in the destination is below the predetermined level (YES at step S310), a resolution of all the image data to be transmitted is converted into a resolution lower than a predetermined resolution level (step S311). As a result, it is possible to restrict the image data to be reused by the receiving side (the destination). If the information disclosure level of the destination exceeds the predetermined level (NO at step S310), the image data is transmitted without any change.

Figure 8:
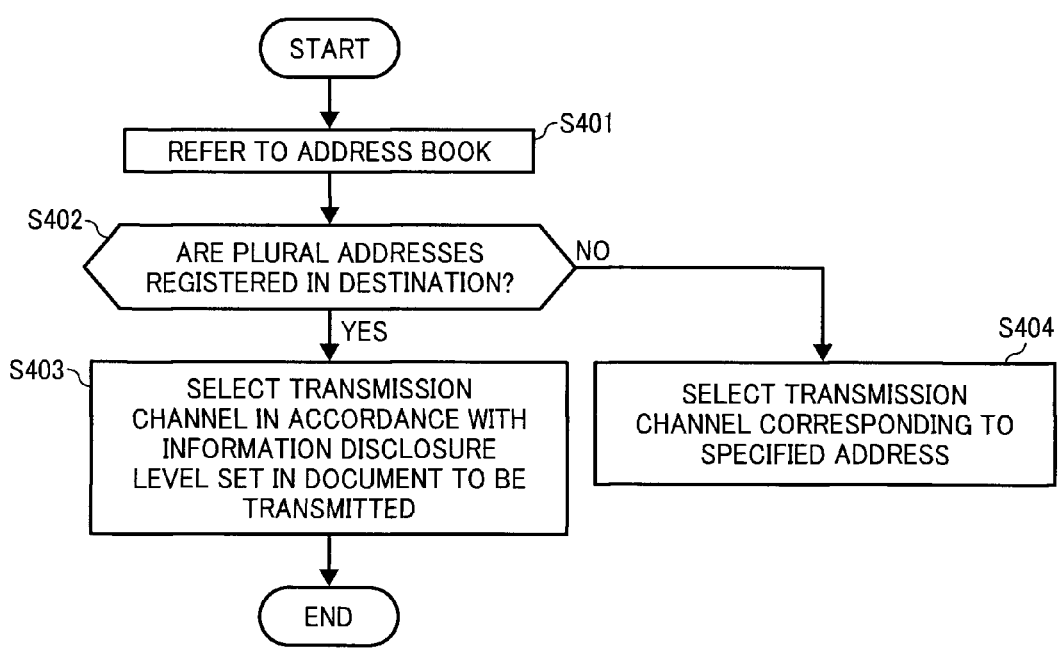
FIG. 8 is a flowchart of an example of a process of selecting a transmission channel.

FIG. 8 is a flowchart of an example of the process of selecting a transmission channel at step S103.

It is determined whether a plurality of addresses is registered in the specified destination (step S402) with reference to the address book (step S401). If a plurality of addresses is registered in the destination (YES at step S402), one of the addresses is selected by selecting a transmission channel in accordance with an information disclosure level set in each page or each image area of a document to be transmitted (step S403).

For example, in a case where an information disclosure level set in each page or each image area of the document to be transmitted is "confidential", which is the highest information disclosure level, "the G3 fax communication" or "the T.38 (IPsec) communication" those having the highest information disclosure level is selected as the transmission channel. At this time, if a fax number is registered in the selected destination, "the G3 fax communication" is selected as the transmission channel. If not a fax number but an IP address is registered in the selected destination, "the T.38 (IPsec) communication" is selected as the transmission channel.

If the determination at step S402 is negative (NO at step S402), i.e., if a single address is registered in the destination, a transmission channel corresponding to the address is selected (step S404).

Figure 9:
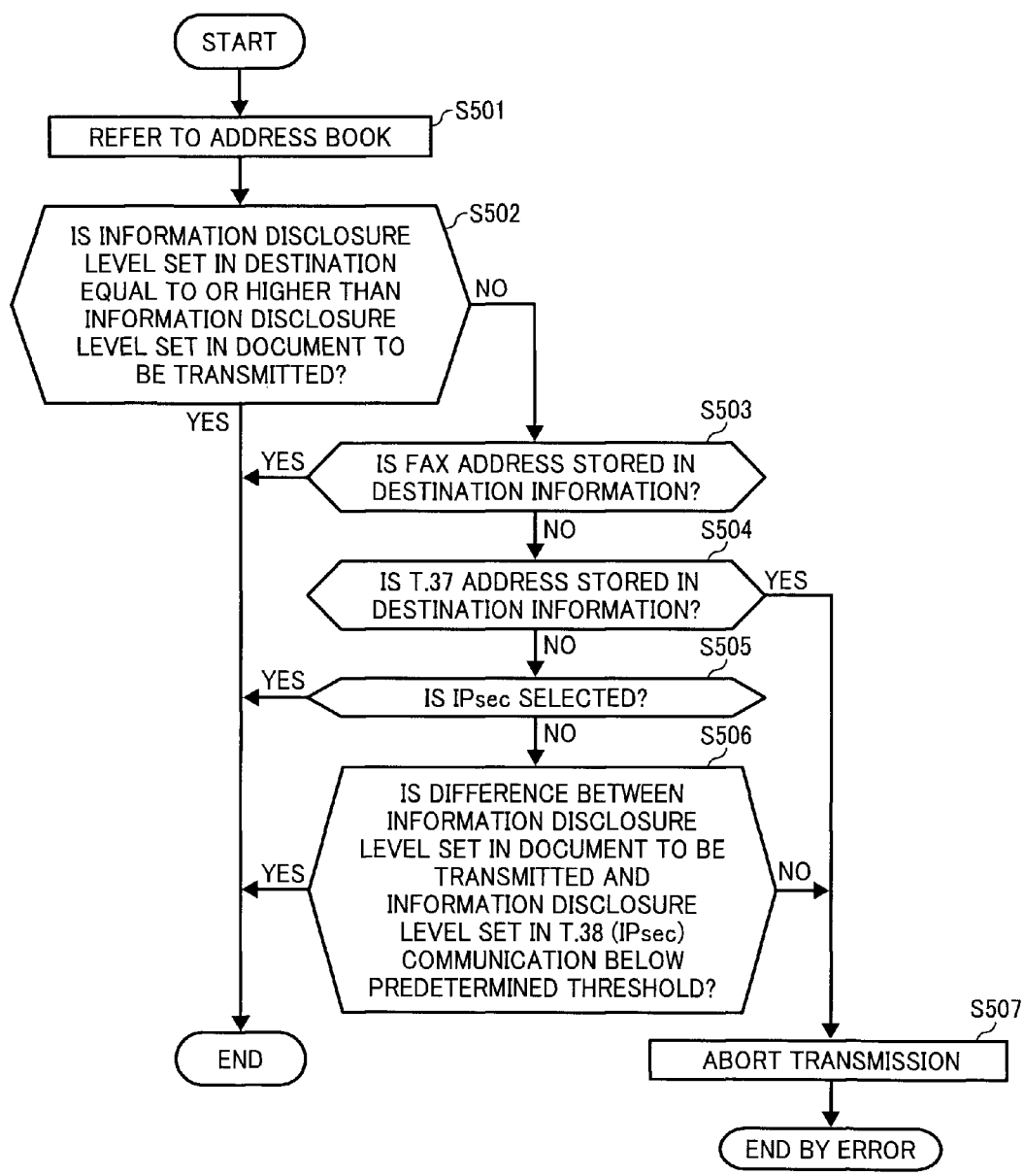
FIG. 9 is a flowchart of another example of the process of selecting a transmission channel.

FIG. 9 is a flowchart of another example of the process of selecting a transmission channel at step S103.

It is determined whether an information disclosure level set in the specified destination is equal to or higher than an information disclosure level set in each page or each image area of a document to be transmitted (step S502) with reference to an address book (step S501). If the information disclosure level set in the destination is equal to or higher than the information disclosure level set in each page or each image area of the document to be transmitted (YES at step S502), a transmission channel corresponding to the information disclosure level set in the destination is used to transmit image data of the document.

If the information disclosure level set in the destination is lower than the information disclosure level set in each page or each image area of the document to be transmitted (NO at step S502), it is determined whether a fax address (a fax number) is stored in destination information on the destination (step S503). If a fax address is stored in the destination information (YES at step S503), the transmission channel needs not be reset.

If a fax address is not stored in the destination information (NO at step S503), it is further determined whether a T.37 address (an e-mail address) is stored in the destination information (step S504). If a T.37 address is not stored in the destination information (NO at step S504), for example, if a T.38 address (an IP address) is stored in the destination information, it is further determined whether the IPsec is selected as a communication mode (step S505). If the IPsec is selected as the communication mode (YES at step S505), it indicates that the T.38 (IPsec) communication is selected as the transmission channel, so that the transmission channel needs not be reset.

If the IPsec is not selected as a communication mode (NO at step S505), it is determined whether a difference between the information disclosure level set in each page or each image area of the document to be transmitted and the information disclosure level set in the T.38 (IPsec) communication is below a threshold (step S506).

If the difference is below the threshold (YES at step S506), it indicates that the image data can be transmitted, so that the transmission channel needs not be reset.

If the difference exceeds the threshold (NO at step S506), it indicates that the image data cannot be transmitted, so that the image data is not transmitted (step S507). The operation display unit 8 can display thereon a message indicating that the image data is not transmitted.

If a T.37 address is stored in the destination information (YES at step S504), the process control goes to step S507, i.e., no image data is transmitted. This is because the T.37 communication has a high risk of information leakage, so that even in a case where the information disclosure level set in the destination is equal to or higher than the information disclosure level set in the document to be transmitted, no image data is transmitted to the destination. In other words, the T.37 communication is set as the lowest information disclosure level, so that no image data is transmitted regardless of the information disclosure level of the document to be transmitted.

As described above, according to the embodiment, image data is transmitted to a destination when an information disclosure level set in the destination is equal to or higher than an information disclosure level set in each page of a document to be transmitted. Therefore, it is possible to prevent the information leakage.

Furthermore, according to the embodiment, only image data of pages having an information disclosure level lower than an information disclosure level set in a destination is transmitted to the destination. Therefore, it is possible to prevent the information leakage.

Moreover, according to the embodiment, when image data of a document to be transmitted is transmitted to a destination having a low information disclosure level, a resolution of the image data is converted into a resolution lower than a predetermined resolution level so as to reduce the reusability of the image data. Therefore, it is possible to prevent the abuse of information.

Furthermore, according to the embodiment, each page of a document to be transmitted is split into a plurality of image areas, and an information disclosure level can be set by each of the image areas. Therefore, only image data of any of the image areas having an information disclosure level lower than an information disclosure level set in a destination is transmitted to the destination. Thus, it is possible to prevent the information leakage.

Moreover, according to the embodiment, image data of any of the image areas having an information disclosure level higher than an information disclosure level set in a destination is scrambled, so that only image data of the remaining image areas having an information disclosure level equal to or lower than the information disclosure level set in the destination is transmitted to the destination. Therefore, it is possible to prevent the information leakage.

Furthermore, according to the embodiment, in a case where a plurality of transmission channels (the fax communication, the T.37 communication, the T.38 communication, and the like) is stored in one of the destination information registered in the address book, a communication security level of each of the transmission channels is rated, and any one of the transmission channels corresponding to an information disclosure level set in a document to be transmitted is automatically selected. Therefore, it is possible to prevent the information leakage with ensuring the security of the transmission channel.

Moreover, according to the embodiment, in a case where a user selects a closed network having a high communication security level as a transmission channel, even if an information disclosure level set in a destination is lower than an information disclosure level set in a document to be transmitted, image data of the document can be transmitted to the destination. Therefore, it is possible to improve the user-friendliness.

Furthermore, according to the embodiment, in a case where the user selects the T.37 communication as a transmission channel, even if an information disclosure level set in a destination is equal to or higher than an information disclosure level set in a document to be transmitted, no image data of the document is transmitted to the destination because a communication security level of the T.37 communication is not sufficiently high. Therefore, it is possible to prevent the information leakage.

Moreover, according to the embodiment, in a case where the user selects the T.38 communication as a transmission channel, if the IPsec having a high communication security level is specified as a communication mode, image data of a document can be transmitted to a destination even if an information disclosure level set in the destination is lower than an information disclosure level set in the document to be transmitted. Therefore, it is possible to improve the user-friendliness.

Figure 10:
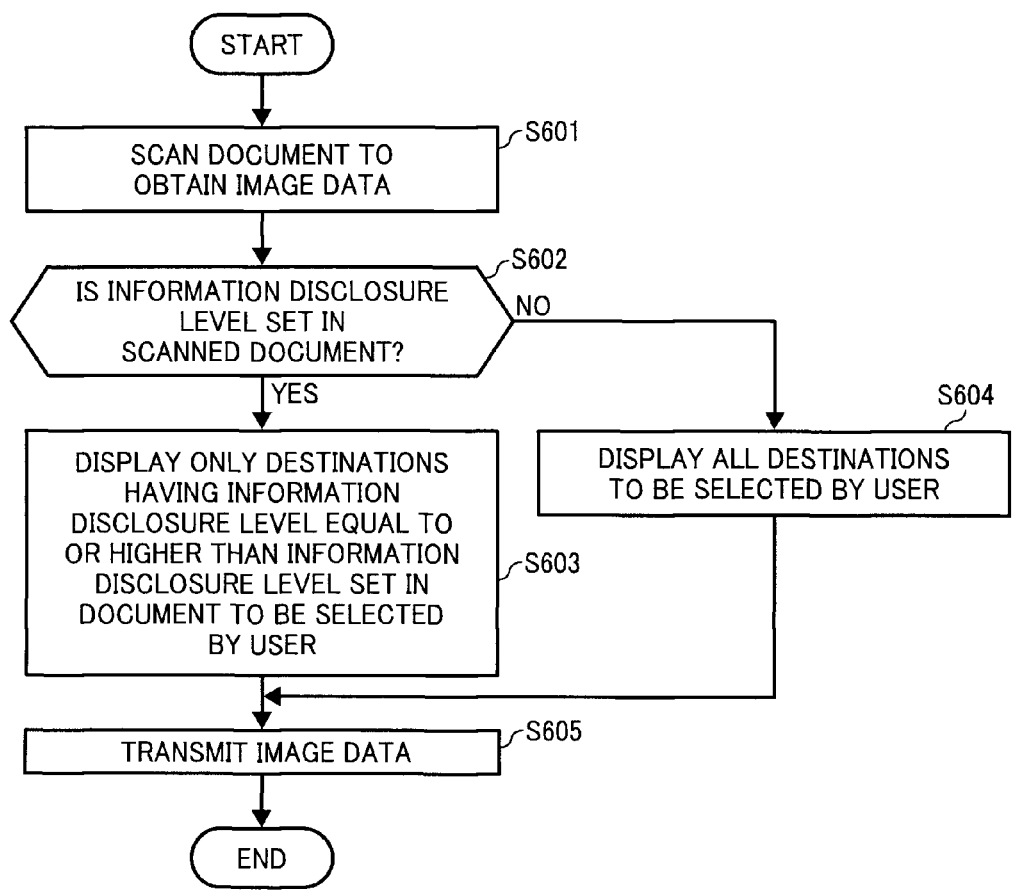
FIG. 10 is a flowchart of a process of limiting a destination in accordance with a scanned document.

FIG. 10 is a flowchart of a process of limiting a destination in accordance with a scanned document.

Generally, a content of a background pattern or a barcode embedded in a document to be transmitted cannot be read by human beings, so that a user cannot visually recognize an information disclosure level of the document. Therefore, when the document is scanned, it is configured to display only destinations having a permissible information disclosure level to transmit image data, and thereby improving the user-friendliness.

A document to be transmitted is scanned to obtain image data by the scanner 6 (step S601). It is determined whether an information disclosure level is set in the document (step S602). If an information disclosure level is set in the document (YES at step S602), only destinations having an information disclosure level higher than the information disclosure level set in the document are displayed on an address book screen of the operation display unit 8 to be selected by the user (step S603).

If no information disclosure level is set in the document (NO at step S602), all destinations registered in the address book are displayed on the address book screen of the operation display unit 8 to be selected by the user (step S604).

When any one of the destinations is selected by the user, the image data of the document is transmitted to the selected destination (step S605).

In this manner, according to the embodiment, an information disclosure level can be set by each destination, and an information disclosure level set in a document to be transmitted can be automatically identified just by scanning additional information embedded in the document, for example, in a pattern of a background or a form of a barcode, and only image data of the document permitted to be disclosed is transmitted to the destination. Therefore, it is possible to prevent the information leakage.

Furthermore, according to the embodiment, to prevent the information leakage with heightening a security level, it is configured to simplify a setting of an information disclosure level for preventing the falsification or reuse of image data of a document to be transmitted.

Incidentally, in the example above, only permissible destinations are displayed on the operation display unit 8. Alternatively, an information disclosure level set in the document can be displayed on the operation display unit 8.

According to the embodiment, the present invention is applied to the network fax apparatus, but not limited thereto. The present invention can be applied to an image forming apparatus (an image transmitting apparatus) including functions of a copier, a printer, a network printer, and the like.

It is also possible to set up an information disclosure level of a destination.

According to an aspect of the present invention, an information disclosure level can be set by each destination, and an information disclosure level set in a scanned document can be automatically identified by scanning additional information embedded in the document in a pattern of a background or a form of a barcode, and it is configured to transmit only image data of the document permitted to be disclosed. Therefore, it is possible to prevent the information leakage.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for transmitting an image data of a document in which an information disclosure level is set, the document including at least one page, the apparatus comprising:

an image acquiring unit configured to acquire the image data and an information disclosure level of the image data;

a destination information storing unit configured to store therein destination information being usable by the apparatus and information disclosure level of the destination;

a determining unit configured to determine the information disclosure level of the image data and the information disclosure level of the destination;

a destination selecting unit configured to select a specified destination to which the image data is to be transmitted and a destination channel of the specified destination based on the information stored in the destination information storing unit;

a transmitting controlling unit configured to transmit the image data to the specified destination, wherein in a case that an information disclosure level set in the specified destination is determined to be lower than all of the information disclosure levels set in all of the image data of the document to be transmitted, subsequent processing to limit the image data to be transmitted is not performed and the transmitting controlling unit transmits all of the image data to the specified destination.

2. The apparatus of claim 1, wherein the document includes plural pages and each specific page of the plural pages of the document has a corresponding disclosure level associated with the specific page, and in a case that a particular page of the plural pages of the document has an information disclosure level lower than the information disclosure level set in the specified destination, the apparatus deletes image data of the particular page, and the apparatus transmits only image data of pages of the document that have an information disclosure level equal to or higher than the information disclosure level set in the specified destination.

3. The apparatus of claim 1, wherein the document includes plural pages and each specific page of the plural pages of the document has a corresponding disclosure level associated with the specific page, and in a case that a particular page of the plural pages of the document has an information disclosure level lower than the information disclosure level set in the specified destination, the apparatus deletes the image data of the particular page.

4. The apparatus of claim 1, wherein the document includes plural pages and each specific page of the plural pages of the document has a corresponding disclosure level associated with the specific page, and in a case that a particular page of the plural pages of the document has an information disclosure level lower than the information disclosure level set in the specified destination, the apparatus scrambles the image data of the particular page.

5. The apparatus of claim 1, wherein the document includes plural pages and each specific page of the plural pages of the document has a corresponding disclosure level associated with the specific page, and in a case that a particular page of the plural pages of the document has an information disclosure level lower than the information disclosure level set in the specified destination, the apparatus replaces the image data of the particular page with a blank image all in white or all in black.

* * * * *